(12) United States Patent
Sebald

(10) Patent No.: US 10,322,795 B2
(45) Date of Patent: Jun. 18, 2019

(54) PROPELLER BLADE MOUNTING SYSTEM

(71) Applicant: Schaeffler Technologies AG & Co. KG, Herzogenaurach (DE)

(72) Inventor: Wilhelm Sebald, Bad Koenigshofen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 429 days.

(21) Appl. No.: 14/904,642

(22) PCT Filed: Mar. 10, 2014

(86) PCT No.: PCT/DE2014/200117
§ 371 (c)(1),
(2) Date: Jan. 12, 2016

(87) PCT Pub. No.: WO2015/010691
PCT Pub. Date: Jan. 29, 2015

(65) Prior Publication Data
US 2016/0152319 A1  Jun. 2, 2016

(30) Foreign Application Priority Data
Jul. 22, 2013 (DE) .......... 10 2013 214 240

(51) Int. Cl.
*B64C 11/06* (2006.01)
*F16C 33/66* (2006.01)
*F16C 19/18* (2006.01)

(52) U.S. Cl.
CPC ............ *B64C 11/06* (2013.01); *F16C 33/664* (2013.01); *F16C 19/181* (2013.01); *F16C 2326/43* (2013.01); *Y02T 50/66* (2013.01)

(58) Field of Classification Search
CPC .. F16C 33/664; F16C 2326/43; F16C 19/181; F04D 29/323; F04D 29/36; F04D 29/362;
(Continued)

(56) References Cited

U.S. PATENT DOCUMENTS 2,460,910 A * 2/1949 Sheets ............... B64C 11/06
                                                416/205
2,998,079 A * 8/1961 Chillson .............. B64C 11/06
                                                416/170 R
(Continued)

FOREIGN PATENT DOCUMENTS

DE         3818466      12/1989
DE       102004060022    7/2006
(Continued)

*Primary Examiner* — Justin D Seabe
*Assistant Examiner* — Julian B Getachew
(74) *Attorney, Agent, or Firm* — Davidson, Davidson & Kappel, LLC

(57) ABSTRACT

A propeller blade mounting system includes a mounting system (4) on rolling bearings between a propeller hub (3) and a propeller blade (2), wherein: at least one bearing outer ring (9) is connected in rotationally fixed manner to the propeller blade (2); at least one bearing inner ring (15, 16, 17) is mounted on the propeller hub (3); a sleeve-shaped central section (13) connected to the propeller blade (2) is disposed radially inside the bearing inner ring (15, 16, 17); and a lubricant chamber (18) is formed between the bearing outer ring (9) and the central section (13) in the radial direction, relative to the rotational axis (R) of the propeller hub (3), and is closed towards the exterior.

17 Claims, 1 Drawing Sheet

(58) Field of Classification Search
CPC .......... F03D 7/0224; F01D 7/00; F01D 5/005;
B64C 11/06
See application file for complete search history.

(56) References Cited

U.S. PATENT DOCUMENTS

| | | | | |
|---|---|---|---|---|
| 3,212,834 | A * | 10/1965 | Mayer | C23C 8/68 |
| | | | | 148/279 |
| 4,634,300 | A * | 1/1987 | Takebayashi | F16C 19/26 |
| | | | | 384/492 |
| 5,015,150 | A | 5/1991 | Rohra | |
| 5,221,372 | A * | 6/1993 | Olson | C21D 7/10 |
| | | | | 148/318 |
| 8,021,053 | B2 * | 9/2011 | Habibvand | F16C 33/3706 |
| | | | | 384/521 |
| 8,057,184 | B2 | 11/2011 | Sebald et al. | |
| 2012/0134822 | A1 | 5/2012 | Boston et al. | |

FOREIGN PATENT DOCUMENTS

| | | |
|---|---|---|
| GB | 640852 | 7/1950 |
| GB | 2244525 | 12/1991 |

\* cited by examiner

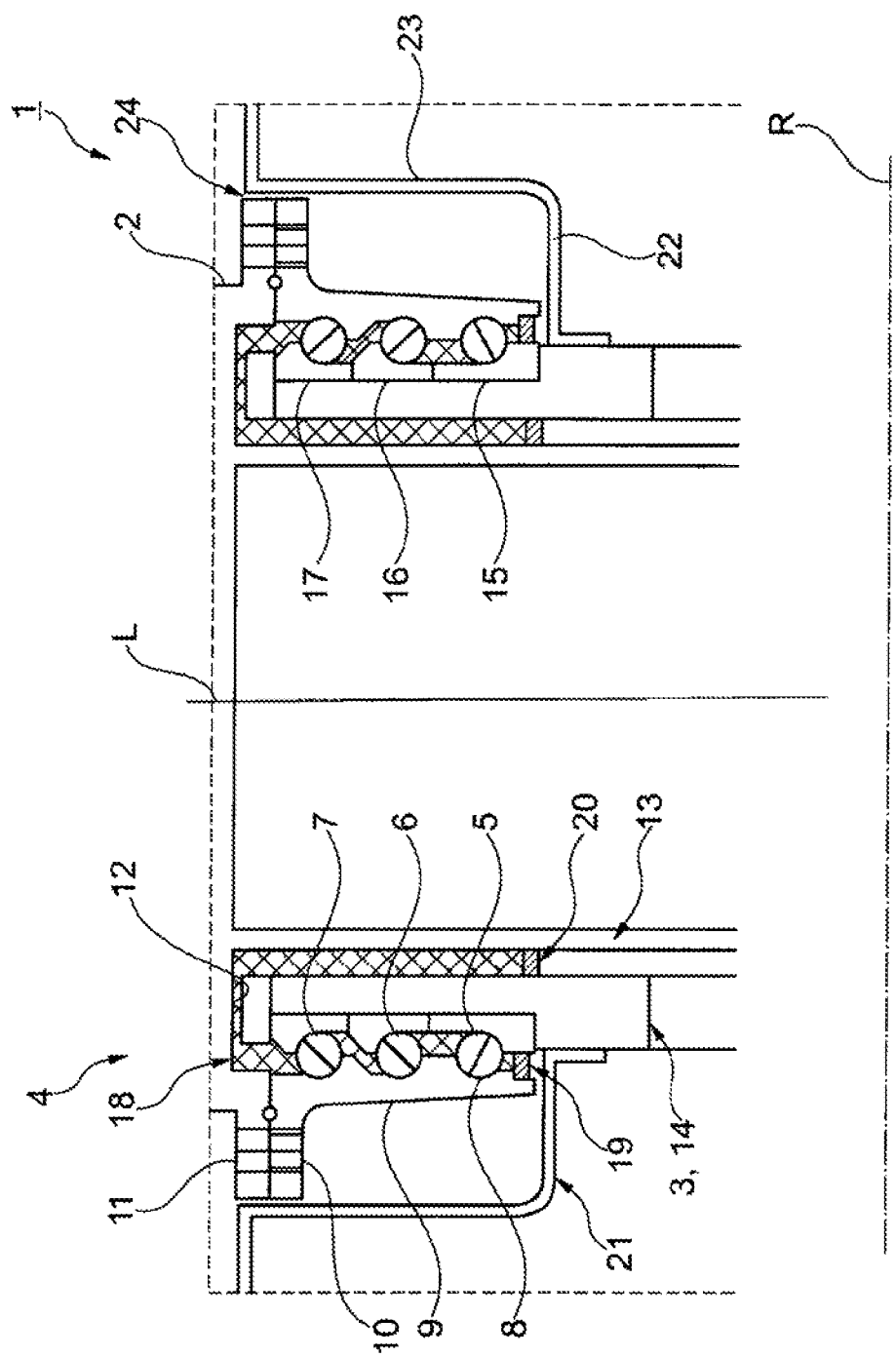

PROPELLER BLADE MOUNTING SYSTEM

The present invention relates to a propeller blade mounting system for adjustable propeller blades of aircraft, the propeller blades being pivotable about their particular longitudinal axis by rolling bearings.

BACKGROUND

A bearing system, using which the propeller blades of an aircraft propeller are adjustably mounted on a hub, is known, for example, from DE 10 2004 060 022 A1. The bearing system is constructed from a primary adjustable bearing and a secondary adjustable bearing, which are each designed as ball bearings and are components of a pre-assembled unit. A lubricant is largely stored in the bearing system and is kept within a specific volume, inter alia, by lubricating oil surge rings, which enclose bearing rings.

A device for propeller blade adjustment, which includes a rolling bearing arrangement having balls and rollers as rolling elements, is known, for example, from GB 2 244 525 A. A pre-tensioning force is applied in this case between a first row of rolling elements, which is formed from balls, and a second row of rolling elements, which is formed from rollers. Corresponding to the bearing system known from DE 10 2004 060 022 A1, an adjustable propeller blade is also connected to inner rings of the bearing in this case, while the associated outer rings are located on the hub.

The adjustability of propeller blades is required in particular in propfan engines. An example of a jacketed propfan engine having adjustable blades is disclosed in DE 38 18 466 C1. In contrast, US 2012/0134822 A1 describes a non-jacketed propfan engine.

Propfan engines are aircraft engines, which have a particularly high bypass ratio to increase the efficiency in relation to older engine versions. In this case, a higher air throughput is generated by the propeller blades, which, as is known from the cited prior art, may either be located inside a jacket or outside any type of housing. To adapt the engine output to the present flight situation at a preferably constant rotational speed of the propulsion engine, the attack angle of the propeller blades is adjusted by pivoting about their axis. For this purpose, each propeller blade is pivotably connected to the hub of the propeller with the aid of a rolling bearing.

SUMMARY OF THE INVENTION

To avoid wear in the contact points of the rolling elements, the rolling bearing is typically located in a chamber completely filled with oil. As a result of the rotational movement of the rotor, the system experiences a centrifugal acceleration, which may correspond to approximately 500 times or more the normal acceleration due to gravity. The secure sealing of the oil chamber under the occurring hydraulic pressure has essential significance for the reliability and durability of the rolling bearing and for avoiding externally visible leaks.

It is an object of the present invention to provide a propeller blade mounting system, which is refined in relation to the prior art and is suitable in particular for rapidly rotating engines of aircraft, and which has a rolling bearing which may be lubricated, assembled, and maintained particularly simply.

The present invention provides a propeller blade mounting system has a rolling bearing between a propeller hub and a propeller blade, at least one bearing outer ring is situated on the propeller blade, which means, it is either an integral part of the propeller blade or is fixedly connected thereto, at least one bearing inner ring is situated on the propeller hub, which means, it is either an integral part of the propeller hub or is fastened thereon, a sleeve-shaped central section, which is fixedly connected to the propeller blade, is situated radially inside the bearing inner ring of the rolling bearing, a lubricant chamber, which is closed to the outside in the radial direction in relation to the axis of rotation of the propeller hub, is provided between the bearing outer ring and the central section.

The term "propeller blade in the broader meaning" is understood in the present case as the entire rotor blade, which is adjustably mounted on the hub, even if it is assembled from multiple individual parts, for example, a blade root and a blade fastened thereon, i.e., a propeller blade in the narrower meaning. The propeller blade mounting system is the mounting system of the propeller blade in the broader meaning on the propeller hub.

The rolling bearing of the propeller blade mounting system is preferably designed as a multi-row, in particular two-row or three-row bearing. The rolling bearing may also have, for example, four, five, or six rows of rolling elements, however. Both balls and also needles, cylinder rollers, and conical rollers come into consideration as rolling elements. A combination of various rolling body shapes and sizes within the rolling bearing is also possible. The rolling elements may be manufactured from rolling bearing steel or a ceramic material, for example, silicon nitride. Rolling elements may be separated from one another by a cage, by cage segments which each guide multiple rolling elements, or by spacer elements situated between each two rolling elements. Metals and plastics, in particular fiber-reinforced plastics, are usable as cage materials.

In one possible specific embodiment, the rolling bearing is designed as a three-row angular contact ball bearing, the three rows of rolling elements being at different distances from the axis of rotation of the propeller hub. With this embodiment, the propeller blade mounting system is primarily designed for absorbing forces which act radially outward. The freedom from play of the propeller blade mounting system is ensured by a pre-tension between the rows of rolling elements. At the same time, mechanical loads are distributed uniformly onto the individual rows of rolling elements and kept low as a whole.

In one particularly advantageous embodiment, the row of rolling elements of the ball bearing which is at the shortest distance from the axis of rotation of the propeller hub forms, together with the middle, second row of rolling elements adjacent thereto and the associated bearing rings, an O-arrangement, while the outermost, i.e., the third row of rolling elements, which is at the greatest distance from the propeller hub, is situated at a contact angle between the bearing rings, the alignment of which corresponds to the contact angle of the middle row of rolling elements. In one particularly preferred embodiment, the contact angle of the middle row of rolling elements corresponds to the contact angle of the outermost row of rolling elements or deviates therefrom by not more than 10°, in particular not more than 5°. In a similar way, the rolling bearing may also have a four-row or multi-row design, the contact angle of the fourth and optionally at least one further row of rolling elements preferably corresponding in this case to the contact angle of the third row of rolling elements.

The two-row, three-row, or multi-row rolling bearing may have a single outer ring and multiple inner rings. The one-piece outer ring may be connected in this case with the aid of a fastening flange formed thereon to the propeller blade or a carrier which holds it. The bearing outer ring is preferably manufactured from steel and has a hardness of 300 HV1 to 500 HV1 and surface-hardened rolling contact surfaces having a hardness of greater than 700 HV1. The surfaces of the outer ring subjected to the environment may have a coating to protect against corrosion. The inner rings may be placed on a bearing pin, which represents a component of the hub, and clamped together thereon. The rolling contact surfaces of all bearing rings may have a wear-resistant coating or surface treatment, in particular carbon nitration.

One particular advantage of the lubricant chamber which is closed radially to the outside is provided in that a seal which acts between parts movable in relation to one another is not required to prevent the lubricant from flowing off in the radial direction in relation to the axis of rotation of the propeller. Seals between parts which are movable, specifically pivotable, in relation to one another, in contrast, may be situated on the radial inner side, in relation to the axis of rotation of the propeller hub, of the lubricant chamber. In this case, a first seal acts between the outer ring and the propeller hub, this first outer seal directly contacting either a bearing inner ring or another part which is fixedly attached to the rotor hub on its inner side, in relation to the longitudinal axis of the propeller blade. A second, inner seal, which seals between the propeller hub and the central section of the propeller blade, also contacts a component of the hub, in particular a sleeve-shaped rotor blade carrier which carries the inner rings, on its outer side, in relation to the longitudinal axis of the propeller blade. In one preferred embodiment, the reliable leak-tightness of the lubricant chamber is enabled at a hydraulic pressure greater than 10 bar, which is generated by centrifugal acceleration and is applied by the lubricant oriented outward in relation to the axis of rotation of the propeller hub.

According to one preferred refinement, the outer ring is enclosed by a protective ring, which is connected to the hub, for example, directly fastened on the hub, situated concentrically in relation to the bearing rings, and may be manufactured, for example, from steel plate or a composite material. In a section, which concentrically encloses the longitudinal axis of the propeller blade, of adjustable components of the propeller blade mounting system, in particular a flange of the outer ring or of the propeller blade, this protective ring may be marginally spaced apart in such a way that hereby an additional, non-contacting seal is provided.

The sleeve-shaped central section of the propeller blade, which occupies a space within the bearing inner rings and forms an inner wall of the lubricant chamber, is preferably a component of an adjustment unit for adjusting the attack angle of the propeller blade. The transmission of a torque, which pivots the propeller blade in the meaning of a pitch adjustment about its longitudinal axis, may be carried out in this case by electrical and/or hydraulic adjustment mechanisms.

The advantage of the present invention is in particular that the propeller blade mounting system is designed as a pre-assembled unit, which may be connected to the rotor hub and the propeller blade substantially without additional adjustment activity. Because the sealing of the oil chamber, i.e., the lubricant chamber, takes place between parts moved toward one another in relation to the rotor axis, radially within the rolling bearing, close to the axis of rotation of the rotor hub, the hydraulic pressure of the oil does not act on dynamic seals during rotation. In contrast, at most static seals are present in a space subjected to hydraulic pressure above the rolling bearing.

BRIEF DESCRIPTION OF THE DRAWING

One exemplary embodiment of the present invention is explained in greater detail hereafter on the basis of a drawing.

FIG. 1 shows a simplified sectional view of a propeller blade mounting system of an aircraft.

DETAILED DESCRIPTION

FIG. 1 schematically shows a propeller blade mounting system, which is identified as a whole with reference numeral 1, of an aircraft, with respect to its principal function of which reference is made to the prior art cited at the outset.

Propeller blade mounting system 1 is used for the pivotable mounting of a propeller blade 2 on a propeller hub 3. The axis of rotation of propeller hub 3 is identified with R, and the longitudinal axis of propeller blade 2 is identified with L. A rolling bearing 4, which is designed as a three-row ball bearing, is provided for adjusting the attack angle of propeller blade 2.

The three rows of rolling elements of rolling bearing 4 are identified as inner row 5, middle row 6, and outer row 7. The rolling elements, i.e., balls, uniformly bear reference numeral 8. Inner row 5 has the least distance and outer row 7 has the greatest distance from axis of rotation R of propeller hub 3. All three rows 5, 6, 7 of rolling elements 8 are at an equal distance from longitudinal axis L of propeller blade 7, i.e., the pivot axis of rolling bearing 4 used for the pitch adjustment.

Rolling bearing 4 is designed as an angular contact ball bearing, which has a single outer ring 9. A flange 10, which is fastened on propeller blade 2, is integrally formed on outer ring 9. Propeller blade 2 also has a fastening flange 11 for this purpose. A ring-shaped front face 12 of propeller blade 2 is located radially inside fastening flange 11, in relation to longitudinal axis L. Front face 12 is delimited radially inwardly, again in relation to longitudinal axis L, by a sleeve-shaped central section 13, which is a component of propeller blade 2. Central section 13, which is identical to propeller blade 2 or is at least fixedly connected thereto, is pivotable via a mechanism for adjusting the attack angle of propeller blades 2 and therefore represents an adjustment ring of an adjustment unit.

A ring chamber, which is closed toward the outside by front face 12, and into which a sleeve-shaped rotor blade carrier 14, which is fixedly connected to propeller hub 3, protrudes, is formed between outer ring 9 and central section 13. Three inner rings 15, 16, 17, on which the rows of balls 5, 6, 7 roll, are clamped on rotor blade carrier 14. A coherent lubricant chamber 18 is formed between inner rings 15, 16, 17 and outer ring 9, between rotor blade carrier 14, which carries inner rings 15, 16, 17, and front face 12 of propeller blade 2, and between rotor blade carrier 14 and central section 13.

During the rotation of propeller hub 3, the lubricant located in lubricant chamber 18 is pressed radially outward and therefore against closed front face 12. To also prevent lubricant from flowing out of lubricant chamber 18 when propeller hub 3 is stationary, this lubricant chamber is closed radially inwardly, in relation to axis of rotation R, by an outer seal 19, which seals between outer ring 9 and innermost inner ring 15, and by an inner seal 20, which seals between rotor blade carrier 14 and central section 13. Entire rolling bearing 4 is covered by a protective ring 21, which is fastened on rotor blade carrier 14. In the sectional view according to FIG. 1, protective ring 21 has an angled shape having a flat disk portion 22, which lies in a plane perpendicular to longitudinal axis L, and a cylindrical wall section 23 adjoining it. Wall section 23 encloses flange 10 of outer ring 9 and fastening flange 11 to form a ring gap 24, which represents a safeguard against the penetration of foreign particles into propeller blade mounting system 1.

The design of bearing rings 9, 15, 16, 17 of rolling bearing 4 is adapted to the aerodynamic forces and mass forces occurring during operation. Inner and middle rows of balls 5, 6 are designed as components of a two-row contact ball bearing in an O-arrangement within rolling bearing 4. Therefore, middle row of balls 6 supports propeller blade 2 in the radial direction, in relation to axis of rotation R, toward the outside, while a support toward the inside is provided by inner row of balls 5. The installation situation of outer row of balls 7 corresponds to the installation situation of middle row of balls 6, which corresponds to the alignment of the pressure lines going through rolling elements 8. Therefore, a twofold support of propeller blade 2 toward the outside and a single support toward the inside is provided overall by three-row rolling bearing 4.

Rolling elements 8 and the rolling contact surfaces of bearing rings 9, 15, 16, 17, on which rolling elements 8 roll, are subjected to greatly varying loads, also by vibrations, during operation of the aircraft having propeller blade mounting system 1, specifically an aircraft having propfan engines. Rolling elements 8, which are designed in accordance with these loads, may be manufactured from completely-hardened roller bearing steel or from a high-performance ceramic. Completely-hardened or surface-hardened rolling bearing steels are suitable for the manufacturing of bearing rings 9, 15, 16, 17. The material from which outer ring 9 is manufactured is not necessarily identical to the material from which inner rings 15, 16, 17 are manufactured. Bearing rings 9, 15, 16, 17 may be provided at least partially, in the area of the rolling contacts, with a wear-resistant coating.

Propeller blade mounting system 1 is suitable not only for propfan engines, but rather also, for example, for turboprop engines of aircraft. A particular advantage of propeller blade mounting system 1 is in any case that it is very well accessible for testing and maintenance purposes.

LIST OF REFERENCE NUMERALS 1 propeller blade mounting system
2 propeller blade
3 propeller hub
4 rolling bearing
5 inner row of balls
6 middle row of balls
7 outer row of balls
8 rolling elements
9 outer ring
10 flange
11 fastening flange
12 front face
13 central section
14 rotor blade carrier
15 inner ring
16 inner ring
17 inner ring
18 lubricant chamber
19 seal
20 seal
21 protective ring
22 disk section
23 wall section
24 ring gap
L longitudinal axis
R axis of rotation

What is claimed is:

1. A propeller blade mounting system, comprising:
   a rolling bearing configured for being provided between a propeller hub and a propeller blade, the rolling bearing including:
   at least one bearing outer ring configured for being connected in a rotatably fixed manner to the propeller blade; and
   at least one bearing inner ring configured for being held on the propeller hub, the at least one bearing inner ring being configured such that a sleeve-shaped central section of the propeller blade is situatable radially within the at least one bearing inner ring, in relation to a longitudinal axis of the propeller blade, the at least one bearing outer ring being configured to at least partially define a lubricant chamber closed to the outside in a radial direction, in relation to an axis of rotation of the propeller hub, by a front face of the propeller blade and formed between the at least one bearing outer ring and the central section, the at least one bearing inner ring including at least three separate bearing inner rings including a first bearing inner ring, a second bearing inner ring and a third bearing inner ring, the rolling bearing being an at least three-row bearing having a first row of first rolling elements contacting the first bearing inner ring, a second row of second rolling elements contacting the second bearing inner ring and a third row of third rolling elements contacting the third bearing inner ring.

2. The propeller blade mounting system as recited in claim 1 wherein the rolling bearing is a ball bearing such that the first, second and third rolling elements are balls.

3. The propeller blade mounting system as recited in claim 1 wherein the first row of first rolling elements is closer to the axis of rotation of the propeller hub than the second row of second rolling elements and the third row of third rolling elements, the first row of first rolling elements forming, together with the second row of second rolling elements, which is adjacent to the first row, and with the first and second bearing inner rings, an O-arrangement, while the third row of third rolling elements is further from the propeller hub than the first row of first rolling elements and the second row of second rolling elements and is situated at a contact angle between the third bearing inner ring and the at least one bearing outer ring, the contact angle of the third row deviating from a contact angle of the second row of second rolling element by not more than 10°.

4. The propeller blade mounting system as recited in claim 1 wherein the at least one bearing outer ring is a single outer ring contacting the first row of first rolling elements, the second row of second rolling elements and the third row of third rolling elements.

5. The propeller blade mounting system as recited in claim 1 wherein the lubricant chamber is sealed on a radial inner side of the lubricant chamber by a first seal situated between the at least one bearing outer ring and the propeller hub, and by a second seal situated between the propeller hub and the central section of the propeller blade.

6. The propeller blade mounting system as recited in claim 5 wherein the lubricant chamber is formed in such a way that a leak-tightness is provided at a hydraulic pressure of at least 10 bar generated by centrifugal acceleration and is oriented outward in relation to the axis of rotation of the propeller hub.

7. The propeller blade mounting system as recited in claim 5 wherein the first seal contacts the at least one bearing inner ring of the rolling bearing.

8. The propeller blade mounting system as recited in claim 5 wherein the second seal contacts a sleeve-shaped rotor blade carrier carrying the at least one bearing inner ring.

9. The propeller blade mounting system as recited in claim 1 wherein the at least one bearing outer ring is enclosed by a protective ring connected to the propeller hub and is situated concentrically in relation to the at least one bearing inner ring.

10. The propeller blade mounting system as recited in claim 1 wherein the central section of the propeller blade is part of an adjustment unit for adjusting an attack angle of the propeller blade.

11. The propeller blade mounting system as recited in claim 1 further comprising a flange connectable to the propeller blade and integrally formed on the at least one bearing outer ring.

12. The propeller blade mounting system as recited in claim 1 wherein the at least one bearing outer ring is manufactured from steel and has a hardness of 300 HV1 to 500 HV1 and surface-hardened rolling contact surfaces having a hardness of greater than 700 HV1.

13. The propeller blade mounting system as recited in claim 1 wherein the at least one bearing outer ring has a partial corrosion protection coating.

14. The propeller blade mounting system as recited in claim 1 wherein the first, second and third rolling elements are situated separate from one another by elements made of synthetic material.

15. The propeller blade mounting system as recited in claim 1 wherein at least one rolling contact surface of the at least one bearing outer ring, the at least one bearing inner ring, and rolling elements of the rolling bearing has a wear protection layer.

16. The propeller blade mounting system as recited in claim 1 wherein the at least one bearing outer ring includes a flange extending radially outward with respect to a longitudinal axis of the propeller blade away from the at least one bearing inner ring, the flange configured for being fastened to the propeller blade.

17. The propeller blade mounting system as recited in claim 16 further comprising a protective ring including a disk portion configured for connecting directly to the central section and a cylindrical wall section extending from the disk portion away from the axis of rotation of the propeller hub, the cylindrical wall section surrounding a radially outer surface of the at least one bearing outer ring.

* * * * *